United States Patent
Roddy et al.

(10) Patent No.: US 9,440,308 B2
(45) Date of Patent: Sep. 13, 2016

(54) RESISTANCE WELDING ELECTRODE

(75) Inventors: Robert J. Roddy, Tecumseh (CA); Allan D. Parks, Amherstburg (CA)

(73) Assignee: DOBEN LIMITED, Windsor (CA)

( * ) Notice: Subject to any disclaimer, the term of this patent is extended or adjusted under 35 U.S.C. 154(b) by 1899 days.

(21) Appl. No.: 12/595,558

(22) PCT Filed: May 29, 2007

(86) PCT No.: PCT/CA2007/000945
§ 371 (c)(1),
(2), (4) Date: Oct. 12, 2009

(87) PCT Pub. No.: WO2008/144873
PCT Pub. Date: Dec. 4, 2008

(65) Prior Publication Data
US 2010/0140243 A1 Jun. 10, 2010

(51) Int. Cl.
*B23K 35/02* (2006.01)
*B23K 11/30* (2006.01)

(52) U.S. Cl.
CPC ....... *B23K 11/3018* (2013.01); *B23K 35/0261* (2013.01); *Y10T 29/49826* (2015.01)

(58) Field of Classification Search
CPC ... B23K 11/115; B23K 11/11; B23K 11/314; B23K 35/0255; B23K 11/00; B23K 11/0006; B23K 11/0013; B23K 10/027; B23K 11/0033
USPC .............. 219/145.1, 119, 120, 78.01, 85.14, 219/85.19, 86.1–86.9, 89, 91.1
See application file for complete search history.

(56) References Cited

U.S. PATENT DOCUMENTS

| | | | | |
|---|---|---|---|---|
| 2,068,043 | A * | 1/1937 | Warnke | 219/119 |
| 2,623,974 | A | 12/1952 | Prucha | |
| 3,657,509 | A | 4/1972 | Beneteau | |
| 4,045,644 | A * | 8/1977 | Shafer et al. | 219/119 |
| 4,609,805 | A * | 9/1986 | Tobita et al. | 219/93 |
| 4,879,091 | A * | 11/1989 | Samal et al. | 419/19 |
| 5,471,029 | A | 11/1995 | Simmons | |
| 5,860,745 | A * | 1/1999 | Squyres | 384/97 |
| 6,008,463 | A * | 12/1999 | Aoyama et al. | 219/119 |
| 6,070,915 | A * | 6/2000 | Luo | 285/125.1 |
| 6,244,411 | B1 * | 6/2001 | Auer | 192/98 |
| 6,355,900 | B1 | 3/2002 | Sherman | |
| 6,750,419 | B2 * | 6/2004 | Roddy et al. | 219/119 |

(Continued)

OTHER PUBLICATIONS

Search Report and Written Opinion mailed on Feb. 29, 2008 for PCT/CA2007/000945.

(Continued)

*Primary Examiner* — Cuong B Nguyen
(74) *Attorney, Agent, or Firm* — Carlson, Gaskey & Olds, P.C.

(57) ABSTRACT

A welding electrode according to the disclosure includes a body. A head is secured to the body and includes an aperture through which a pin extends. A polymer insulating sleeve is arranged between the pin and the head, for example. The sleeve material extends radially from an inner diameter to an outer diameter. The outer diameter engages the head, and the inner diameter is in close proximity to and engagement with the pin, which slides axially relative to the sleeve. The head and sleeve include first and second interlocking features that cooperate with one another to retain the sleeve in the aperture. The sleeve is arranged inboard from an outer face of the head, which is used to support a work piece.

13 Claims, 2 Drawing Sheets

(56) References Cited

U.S. PATENT DOCUMENTS

| | | | |
|---|---|---|---|
| 7,644,499 B2* | 1/2010 | Smoot et al. | 29/895.23 |
| 2005/0284847 A1* | 12/2005 | Aoyama et al. | 219/93 |
| 2008/0142228 A1* | 6/2008 | Harvey et al. | 166/378 |

OTHER PUBLICATIONS

International Preliminary Report and Patentability mailed on Aug. 14, 2009 for PCT/CA2007/000945.

* cited by examiner

RESISTANCE WELDING ELECTRODE

BACKGROUND

This application relates to a resistance welding electrode for welding fasteners to a metallic object, for example. More particularly, the application relates to an insulating sleeve used to insulate a pin from an electrode head.

Weld gun assemblies are used to resistance weld fasteners to metallic objects, such as body panels for vehicles. A fastener such as a weld stud or nut is loaded onto one of the electrodes. The electrodes are moved together with an actuator placing the fastener into engagement with the panel under pressure. Very high currents are applied to the electrodes, which welds the fastener to the panel. The use of weld guns is typically an automated process in which the fasteners are loaded into the weld gun assembly.

A widely used electrode in the industry utilizes a pin that receives a weld nut. The pin is biased to an extended position to receive the weld nut. The pin must be insulated from the electrode to prevent arcing. Further, the pin must move precisely to ensure that the nut is loaded properly on the pin. If arcing occurs, the surface of the pin could be damaged and prevent the unrestricted travel of the pin. Furthermore, a portion of the welding current will flow through the pin instead of the intended path through the nut and panel and the threads of the nut might be welded to the pin. Some pin arrangements are susceptible to debris, such as molten metal, becoming caught in the gap between the pin and head.

In one type of electrode, a stainless steel sleeve is arranged in an aperture in the electrode head through which the pin extends. A layer of fiberglass insulation bonds the stainless steel sleeve to the head and insulates the pin. Typically, both the stainless steel sleeve and head include grooves so the fiberglass interlocks the sleeve to the head. This type of insulating arrangement is more costly than desired.

Another example electrode includes a non-conductive ceramic coated pin. These pins are more costly to produce and are more difficult to precisely locate relative to the electrode head during welding operations. Another type of arrangement uses phenolic sleeves, which are adhered to the head. However, the phenolic sleeves are prone to swelling and mechanical deformation, which can permit undesired movement of the pin.

The prior art insulating sleeves extend the length of the aperture. The sleeve is typically chamfered after the outer face of the head, which supports the work piece, has been machined. Occasionally, molten metal produced during the welding process can become lodged in the chamfer thereby interfering with movement of the pin. Further, resurfacing the outer face after it has become worn requires the insulating sleeve to be chamfered again.

What is needed is a cost effective resistance welding electrode that provides precise pin location and is less susceptible to jamming from debris.

SUMMARY

A welding electrode according to the disclosure includes a body. A head is secured to the body and includes an aperture through which a pin extends. In one example arrangement, the pin receives a welding nut. A polymer insulating sleeve is arranged between the pin and the head, for example. The sleeve material extends radially from an inner diameter to an outer diameter. The outer diameter engages the head, and the inner diameter is in close proximity to and engagement with the pin, which slides axially relative to the sleeve. The head and sleeve include first and second interlocking features that cooperate with one another to retain the sleeve in the aperture. The sleeve is arranged inboard from an outer face of the head, which is used to support a work piece.

In one example method of manufacture, the electrode head is machined to provide the aperture with the first interlocking feature. The polymer sleeve is machined with the second interlocking feature. The sleeve is inserted into the aperture so that first and second interlocking features interlock with one another thereby retaining the sleeve within the aperture. The outer face can be resurfaced without affecting the sleeve.

Accordingly, the above example embodiment provides a cost effective resistance welding electrode that provides precise pin location and is less susceptible to jamming from debris.

BRIEF DESCRIPTION OF THE DRAWINGS

Other advantages of the example embodiment can be understood by reference to the following detailed description when considered in connection with the accompanying drawings wherein.

DETAILED DESCRIPTION OF THE DRAWINGS

Figure 1:
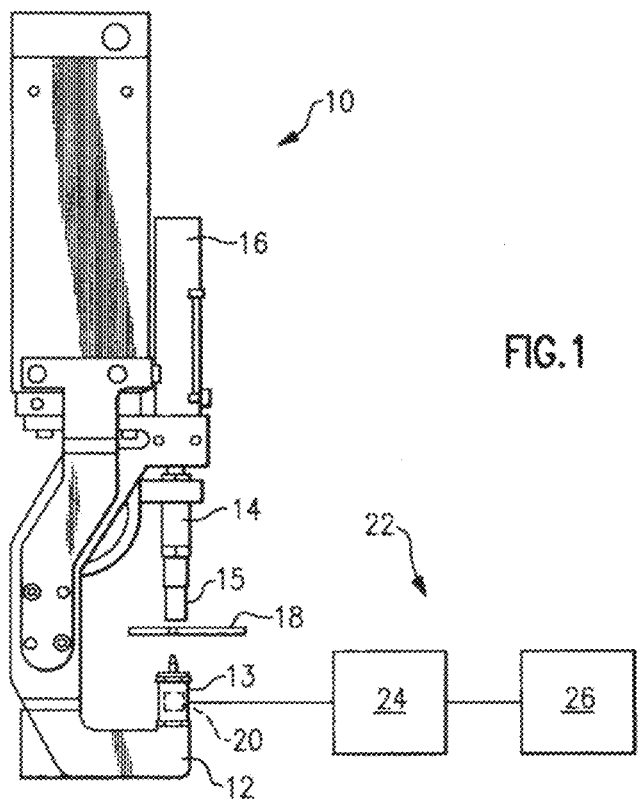
FIG. 1 is a schematic view of an example weld gun assembly.

FIG. 1 is a highly schematic view of a weld gun assembly 10. The weld gun assembly 10 includes a stationary lower arm 12 supporting a lower electrode 13. A movable electrode holder 14 is connected to an actuator 16. The movable electrode holder 14 supports an upper electrode 15. The actuator 16 moves the moveable electrode holder 14 from an open position (shown) to a closed position in which the electrodes 13 and 15 are in engagement with an object 18 to be welded, such as a vehicle body panel. While the arms and electrodes are referred to in terms of "upper" and "lower," it is to be understood that the weld gun assembly 10 and its components may be oriented in a manner other than described and remain within the scope of the claims.

A fastener, such as a weld stud or nut, is loaded onto one of the electrodes 13 and 15 and forced into engagement with the object 18. A position sensor 20 in the electrode 13 can be used to detect the position and orientation of the fastener from underneath the object 18. The information from the sensor is sent to a sensor control system 22 that includes an amplifier 24 and a controller 26, for example, which processes the signal into information that may be used to trigger a fault.

Figure 2:
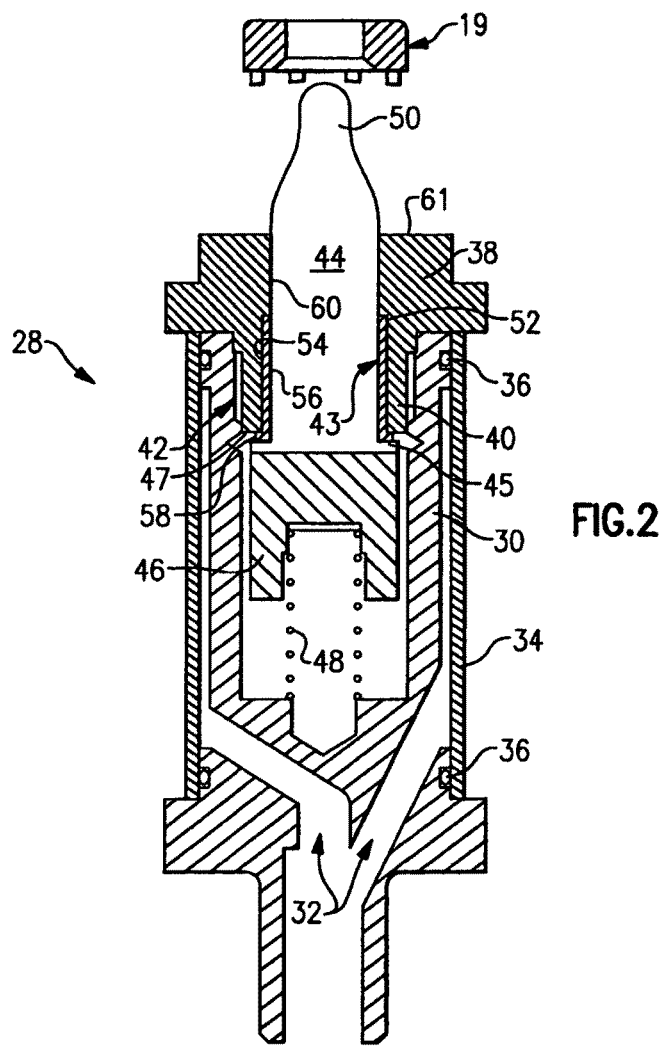
FIG. 2 is a cross-sectional view of an example electrode.

An example electrode 28 is shown in FIG. 2. The electrode 28 includes a body 30 having various cooling passages 32. An outer sleeve 34 is arranged over the body 30 along with seals 36 to enclose the cooling passages 32. A head 38 is secured to the body 30 and supports the object 18 on an outer face 61 during welding. In one example, the head 38 includes an end 40 having threads 42 that cooperate with threads within the body 30. The head can be removed and the outer face 61 resurfaced as it becomes worn from use.

An aperture 43 extends from the outer face 61 to an inner face 47. A pin 44 extends through the aperture 43 and includes a tip 50 for supporting a fastener 19. A stop 46 is arranged within the body 30 and supports the pin 44 opposite the tip 50. A spring 48 is arranged between the body 30 and stop 46 for biasing the pin 44 to an extended position, which is shown in FIG. 2. The pin 44 is depressed during the welding operation, which moves the pin 44 axially within the aperture 43 relative to the head 38. In one example, the stop 46 is an insulator and limits the axial travel of the pin 44.

An insulating sleeve 52 is arranged radially between the head 38 and the pin 44. In one example, the sleeve 52 is constructed from a polymer material, such as a glass reinforced nylon. The sleeve 52 includes a radially extending lip 58 arranged at the inner face 47. The pin 44 includes a radially extending flange 45 that abuts the lip 58 when the pin 44 is in the extended position. The lip 58 insulates the pin 44 from the head 38 in the extended position.

The sleeve 52 includes an outer diameter 54 in engagement with the head 38, and an inner diameter 56, which engages the pin 44. The polymer pin material extends radially inwardly from the outer diameter 54 to the inner diameter 56, which provides a pin support surface along which the pin 44 slides. In one example, the sleeve 52 is retained within the aperture 43 in a press-fit relationship without the use of adhesive. However, it should be understood that adhesive may be additionally used between the sleeve 52 and the head 38, if desired.

Figure 3:
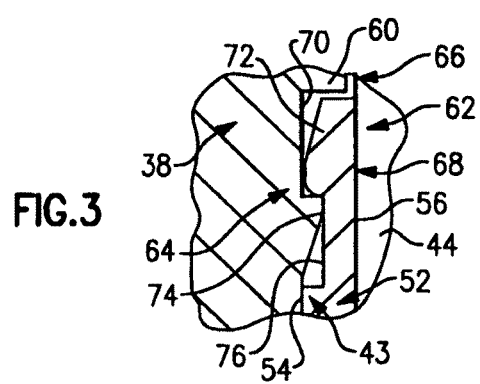
FIG. 3 is an enlarged cross-sectional view of a portion of the electrode head, sleeve and pin.

Referring to FIG. 3, the head 38 includes a first interlocking feature 62 that includes a tapered protrusion 74 and a groove 70, for example. The sleeve 52 includes a second interlocking feature 64 that cooperates with the first interlocking feature 62 to retain the sleeve 52 relative to the head 38. In one example, the second interlocking feature 64 includes a tapered tab 72 and a recess 76. The tapered tab 72 engages and is deflected radially inward by the tapered protrusion 74 as the sleeve 52 is inserted axially from the inner face 47 into the aperture 43 during assembly. The tapered tab 72 is received in the groove 70, and the tapered protrusion 74 is received in the recess 76 once the sleeve 52 has been installed into the head 38.

In the example shown in the Figures, the sleeve 52 does not extend all the way to the outer face 61. Instead, the end of the sleeve 52 is substantially spaced inboard from the outer face 61 so that the end of the sleeve 52 is protected by a shoulder 60 in the head 38. The diameter of the aperture 43 nearer the outer face 61 is smaller that the diameter of the aperture 43 in which the sleeve 52 is retained. This arrangement prevents exposure of the sleeve 52 to molten metal during the welding operation and shields the end of the sleeve 52 from heat. The outer face 61 can be resurfaced without requiring machining of the sleeve 52. As best illustrated in FIG. 3, the interface of the sleeve 52 and the pin 44 maintains a tight second clearance 68, which enables precise movement of the pin 44. The relatively looser first clearance 66 between the pin 44 and head 38 ensures that there is no contact or arcing between the pin 44 and head 38 while still maintaining a small enough gap to prevent intrusion of molten metal.

Figure 4:
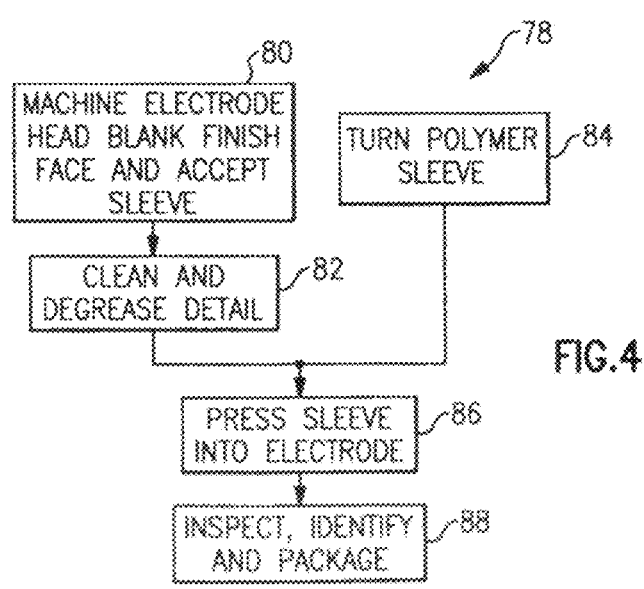
FIG. 4 is a flow chart depicting an example method of manufacturing the electrode.

A method of manufacturing the example electrode 28 is schematically shown in FIG. 4. The method 78 includes machining the head 38 to provide the aperture 43 and the first interlocking feature 62, as indicated at block 80. The machined head 38 is cleaned and degreased, as indicated at block 82. The sleeve 52 is machined from a polymer material, for example, as indicated at block 84. The outer diameter 54 of the sleeve 52 can be machined in such a manner so as to provide a rough surface that enhances the interference fit between the outer diameter 54 and the aperture 43. The second interlocking feature 64 is machined into the sleeve 52. Referring to block 86, the sleeve 52 is inserted into the aperture 43 from the inner face 47 so that the lip 58 seats against the inner face 47, in one example. The assembly of the head 38 and sleeve 52 is inspected and packaged, as indicated at block 88.

The example embodiment has been described in an illustrative manner, and it is to be understood that the terminology that has been used is intended to be in the nature of words of description rather than of limitation. Obviously, many modifications and variations of the example embodiment are possible in light of the above teachings. It is, therefore, to be understood that within the scope of the appended claims the example embodiment may be practiced otherwise than as specifically described.

The invention claimed is:

1. A welding electrode comprising:
   a body;
   a head secured to the body and including an aperture;
   a pin arranged within the body and extending through the aperture;
   a polymer insulating sleeve arranged between the pin and the head, the polymer insulating sleeve extending radially from an inner diameter to an outer diameter that are respectively in contact with the pin and head; and
   wherein the head and the polymer insulating sleeve respectively include first and second interlocking features interlocking with one another to retain the polymer insulating sleeve within the head, wherein the polymer insulating sleeve is in a snap fit with the head within the aperture.

2. The welding electrode according to claim 1, wherein the polymer is a glass reinforced nylon.

3. The welding electrode according to claim 1, wherein the pin is slidingly received within the polymer insulating sleeve and configured to move axially between extended and depressed positions.

4. The welding electrode according to claim 1, wherein the polymer insulating sleeve is arranged inboard of an outer face that is configured to support a work piece.

5. The welding electrode according to claim 4, wherein the aperture includes a shoulder, an end of the pin arranged near the shoulder, the aperture including a first diameter near the outer face that is smaller than a second diameter of aperture that receives the polymer insulating sleeve.

6. The welding electrode according to claim 1, wherein the polymer insulating sleeve includes a radially extending lip adjacent to an inner surface of the head, the pin including a radially extending flange abutting the radially extending lip in an extended position.

7. A welding electrode comprising:
   a body;
   a head secured to the body and including an aperture;
   a pin arranged within the body and extending through the aperture;
   a polymer insulating sleeve arranged between the pin and the head, the polymer insulating sleeve extending radially from an inner diameter to an outer diameter that are respectively in contact with the pin and head; and
   wherein the head and the polymer insulating sleeve respectively include first and second interlocking features interlocking with one another to retain the polymer insulating sleeve within the head, wherein the polymer insulating sleeve in arranged inboard of an outer face that is configured to support a work piece, wherein the aperture includes a shoulder, and end of the pin arranged near the shoulder, the aperture including a first diameter near the outer face that is smaller than a second diameter of aperture that receives the polymer insulating sleeve, wherein a first radial clearance is provided between the pin and the head and a second radial clearance between the polymer insulating sleeve and the pin, the first radial clearance smaller than the second radial clearance, the polymer insulating sleeve absent between the pin and the head at the first diameter corresponding to a location of the first radial clearance.

8. A welding electrode comprising:
a head including an aperture extending from an outer face to an opposite inner face, the outer face configured to support a work piece;
an insulating sleeve received within the aperture, the insulating sleeve constructed from an insulating material that is in engagement with the head, the insulating material extends radially inwardly to provide a pin support surface; and
interlocking features retaining the insulating sleeve relative to the head, wherein the head includes a first interlocking feature, and the insulating sleeve includes a second interlocking feature cooperating with the first interlocking feature in a snap fit relationship.

9. The welding electrode according to claim 8, wherein the first interlocking feature includes a groove and the second interlocking feature includes a tapered tab received in the groove.

10. The welding electrode according to claim 8, wherein the insulating sleeve includes an outer diameter having a roughened surface in an interference fit with the head.

11. A method of manufacturing an electrode comprising the steps of:
machining a head to include an aperture and a first interlocking feature;
machining an insulating sleeve to include a second interlocking feature; and
inserting the insulating sleeve into the aperture such that the first and second interlocking features engage one another in a snap fit.

12. The method according to claim 11, wherein the insulating sleeve is arranged inboard from an outer face of the head, and comprising the step of resurfacing the outer face without machining the insulating sleeve.

13. The method according to claim 11, wherein the first interlocking feature corresponds to a groove, and the second interlocking feature corresponds to a tab cooperating with the first interlocking feature to deflect radially inward in response to the inserting step, the tab received in the groove in an installed position of the insulating sleeve.

* * * * *